(12) United States Patent
Brugmann, Jr.

(10) Patent No.: US 6,598,286 B1
(45) Date of Patent: *Jul. 29, 2003

(54) METAL TUBE COUPLING ARRANGEMENT AND METHOD OF MANUFACTURE

(76) Inventor: Donald Howard Brugmann, Jr., 2120 C.H. 44, Nevada, OH (US) 44849

( * ) Notice: Subject to any disclaimer, the term of this patent is extended or adjusted under 35 U.S.C. 154(b) by 69 days.

This patent is subject to a terminal disclaimer.

(21) Appl. No.: 10/222,460

(22) Filed: Aug. 16, 2002

Related U.S. Application Data

(62) Division of application No. 09/548,108, filed on Apr. 12, 2000, now Pat. No. 6,453,539.

(51) Int. Cl.⁷ ................................................ F16L 35/00
(52) U.S. Cl. .......................... 29/516; 29/516; 285/334.5
(58) Field of Search ........................ 29/516; 285/334.5, 285/382, 331

(56) References Cited

U.S. PATENT DOCUMENTS

| | | | |
|---|---|---|---|
| 2,062,780 A | 12/1936 | Curtis | |
| 2,477,676 A | 8/1949 | Woodling | |
| 3,715,800 A | 2/1973 | Leopold | 29/523 |
| 3,833,984 A | 9/1974 | Dietzel | 29/523 |
| 3,902,746 A | 9/1975 | Brandt | 29/516 |
| 3,970,336 A | 7/1976 | O'Sickey et al. | 29/516 |
| 4,076,280 A | 2/1978 | Young | |
| 4,128,264 A | 12/1978 | Oldford | |
| 4,626,001 A | 12/1986 | Lee | 29/516 |
| 5,131,687 A | 7/1992 | Marchou | |
| 5,297,827 A | 3/1994 | Choi | |
| 5,489,127 A * | 2/1996 | Anglin et al. | 285/328 |
| 5,529,349 A * | 6/1996 | Gibbs et al. | 285/332 |
| 5,658,025 A | 8/1997 | Ridenour | 29/516 |
| 5,711,549 A | 1/1998 | Beans | |
| 5,718,459 A * | 2/1998 | Davie et al. | 285/148.19 |
| 5,743,571 A * | 4/1998 | Gaitros et al. | 285/39 |
| 6,109,660 A * | 8/2000 | Akiyama et al. | 285/45 |

* cited by examiner

Primary Examiner—Gregory M. Vidovich
Assistant Examiner—Stephen Kenny

(57) ABSTRACT

An arrangement for locking a metal tube to a hose fitting in which the end of the metal tube is flared to form a generally conical tube end, and the conical tube end is inserted into a fitting to seat against an opposing conical shoulder. The portion of the fitting surrounding the tube is then plastically deformed around the tube firmly and sealingly to grasp the tube, but without scarring a corrosion resistant coating on the tube. A plurality of barbs preferably are formed on the radially outer surface of the flared end of the tube for engaging the fitting when the fitting is crimped over the flared end of the tube and thereby preventing rotation of the tube with respect to the body of the fitting. The other end of the fitting may be crimped or otherwise secured to a constituent part such as a fluid hose.

17 Claims, 2 Drawing Sheets

METAL TUBE COUPLING ARRANGEMENT AND METHOD OF MANUFACTURE

This application is a division of application Ser. No. 09/548,108 filed Apr. 12, 2000 which has matured into U.S. Pat. No. 6,453,539.

The present invention is directed to mechanical locking of a metal tube to a metal hose fitting, and more particularly to coupling of a metal tube to a fitting at the end of a hose or other constituent part in a vehicle fluid system such as an automotive brake system.

BACKGROUND AND SUMMARY OF THE INVENTION

Mechanical tube coupling arrangements in vehicle fluid systems, such as automotive brake systems, must be leak resistant at high internal fluid pressure on the order of several thousand psi. Tube fittings that employ threaded tube nut joints tend to leak at high fluid pressure because of improper tightening torque and unsatisfactory sealing surface conditions. The fluid tubes are located in areas that can be subjected to corrosive materials such as salt, and it has become the practice to coat the metal tubes for enhanced corrosion resistance. Consequently, the tube end fitting must be such as not to scratch or remove the coating, which can provide a site for corrosion attack. It is therefore a general object of the present invention to provide a tube coupling arrangement and a method of manufacture that do not damage a corrosion resistant coating on the fluid tube, that withstand leakage at elevated fluid pressure, that employ otherwise conventional machining and processing techniques, and that employ a reduced number of parts and therefore exhibit reduced manufacturing costs.

A tube coupling arrangement in accordance with presently preferred embodiments of the invention includes a metal fitting having an end, an internal through passage, and a conical groove that extends radially and axially outwardly from the through passage away from the tube end and into the body of the fitting. A metal tube is received in the through passage of the fitting, and has an outwardly flared conical end disposed in the conical groove within the fitting. The end of the fitting is plastically deformed around the tube in sealing engagement with an external surface of the tube and firmly to hold the tube end in sealing engagement with the conical groove. In the preferred embodiments of the invention, the conical end of the tube is either single-thickness or is doubled upon itself so that the conical end has a double tube wall thickness within the internal groove in the fitting. Barbs preferably are formed in the flared end of the tube to prevent rotation of the tube within the fitting. The coupling arrangement of the present invention thus eliminates potential fluid leak paths associated with threaded coupling joints, and potential damage to the corrosion coating on the tube.

A method of securing a cylindrical metal tube to a metal constituent part, such as a fitting, in accordance with another aspect of the present invention includes the steps of flaring an end of the tube to form a conical end configuration, inserting the conical tube end configuration into a fitting to abut a shoulder within the fitting, and then securing the fitting to the tube by plastically deforming the fitting around the external surface of the tube end. The tube end may be folded upon itself prior to or during the step of flaring the tube end, so that the tube end has either a single or double wall thickness in the area of abutment against the shoulder within the fitting. Barbs are preferably formed in the flared end of the tube prior to insertion of the tube into the fitting to prevent rotation of the tube within the fitting after the fitting is crimped over the tube end.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENTS

Figure 1:
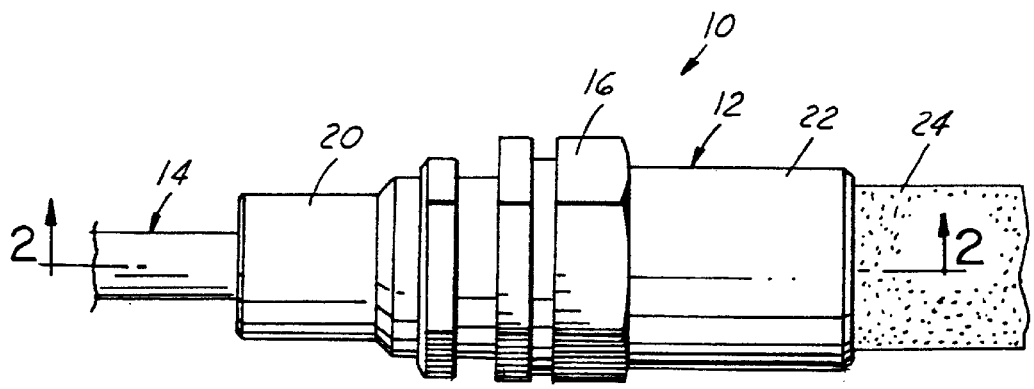
FIG. 1 is a fragmentary elevational view of a tube/hose fitting in accordance with a presently preferred embodiment of the invention.
Figure 2:
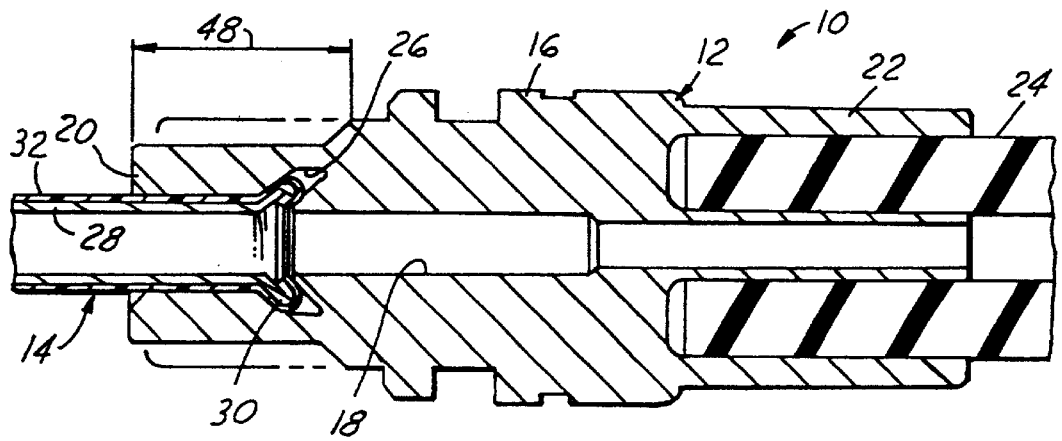
FIG. 2 is a fragmentary sectional view taken substantially along the line 2—2 in FIG. 1.

FIGS. 1 and 2 illustrate a tube coupling arrangement 10 in accordance with a presently preferred embodiment of the invention as comprising a metal hose end fitting 12 sealingly secured to a metal fluid tube 14. Fitting 12 comprises an elongated body 16 having an axial fluid through passage 18. One end 20 of fitting body 16 is crimped or otherwise deformed around the opposing external end of tube 14, while the other end 22 of fitting body 16 is crimped or otherwise secured to a hose 24 or other constituent part. Fitting 12 has a circumferentially continuous conical internal groove 26 that extends from the passage 18 radially outwardly and axially away from fitting end 20.

Tube 14 is of elongated cylindrical construction, having an outwardly flared conical end 30 disposed within conical groove 26 surrounding passage 18 within fitting body 16. In the embodiment of FIGS. 1–4, tube end 30 is doubled upon itself so as to provide a double tube wall thickness within fitting groove 26. The inside diameter of tube body 28 is substantially equal to that of fitting through passage 18, and the doubled end of tube end 30 does not extend into this passage, so as to provide a smooth passage for fluid flow between tube 14 and fitting 12. Tube 14 may be of metal such as low carbon steel, stainless steel or copper, having a thin external surface coating 32 for corrosion resistance. Fitting 12 may be of brass, steel or stainless steel construction.

Figure 3:
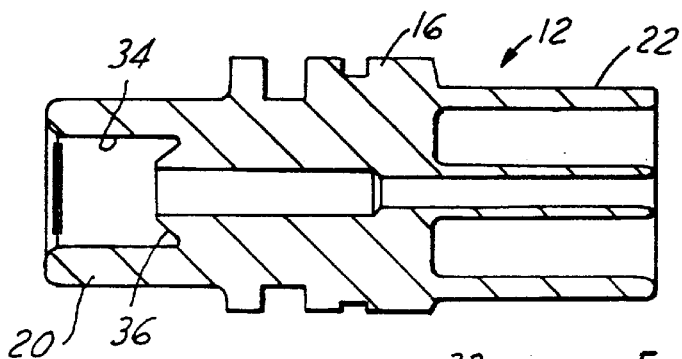
FIG. 3 is a sectional view diametrically bisecting the fitting of FIGS. 1 and 2 prior to assembly with the tube end.
Figure 4:
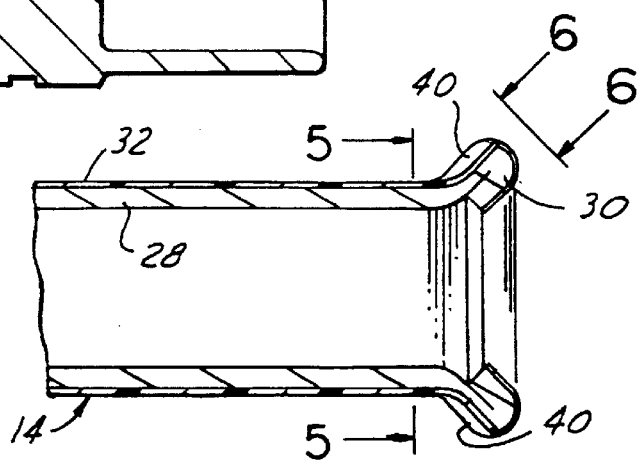
FIG. 4 is a fragmentary sectional view of the flared tube end in the embodiment of FIG. 2 on an enlarged scale.
Figure 5:
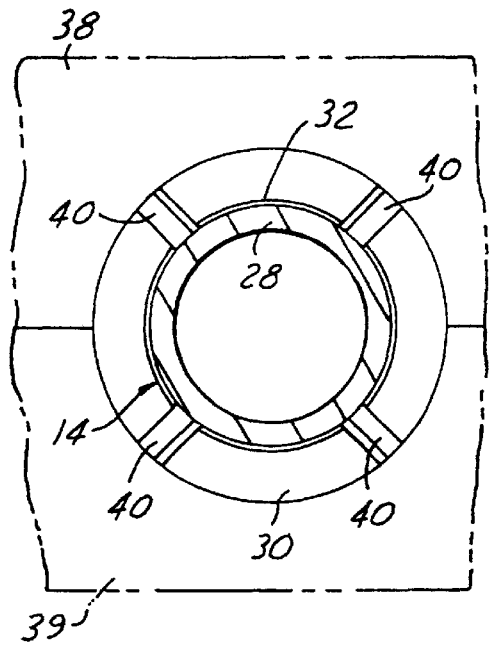
FIGS. 5 and 6 are sectional views taken substantially along the lines 5—5 and 6—6 in FIG. 4.
Figure 6:
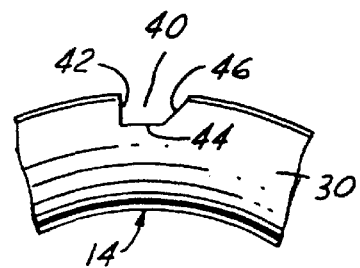

FIG. 3 illustrates hose fitting 12 prior to assembly to tube 14 (or hose 24). Fitting end 20 forms a radially enlarged cylindrical opening 34 that terminates in an axially and radially outwardly angulated conical shoulder 36. Fitting 12 is circumferentially symmetrical, and shoulder 36 extends circumferentially around through passage 18. To assemble coupling 10, tube end 30 is doubled upon itself as illustrated in FIGS. 2 and 4, and then placed in a die 38 for forming two pairs of diametrically opposed orthogonally spaced barbs 40 (FIGS. 4–6) in the radially outer surface of the flare. Each barb 40 includes a radially inwardly extending wall surface 42 (FIG. 6) at right angle to the outer surface of the flare, a flat or arcuate bottom surface 44, and an angulated side surface 46. Angulated side surfaces 46 facilitate extraction of the flared tube end from the die elements 38, 39 (FIG. 5). The flared and barbed end of tube 14 is then inserted into opening 34 to seat against shoulder 36. Fitting end 20 is then plastically deformed in the area 48 (FIG. 2) around the external surface of the flared end of tube 14 in a crimping or other suitable deforming operation. As fitting end 20 is reduced in diameter, radial and axial forces are exerted on the external surface of tube body 28 permanently to seal and lock the tube end within fitting end 20 and against shoulder 36. The total surface area in the zone of deformation achieves sealing engagement with the tube body and mechanically supports the tube body during further processing and use. Barbs 40 help prevent rotation of tube 14 with respect to fitting 12 upon application of torque to the fitting or the tube during installation or use. Plastic deformation of fitting end 20 around the flared end of the tube also deforms fitting end 20 so as to form groove 26 in body 16 (FIG. 2) around fitting shoulder 36 (FIG. 3).

Figure 7:
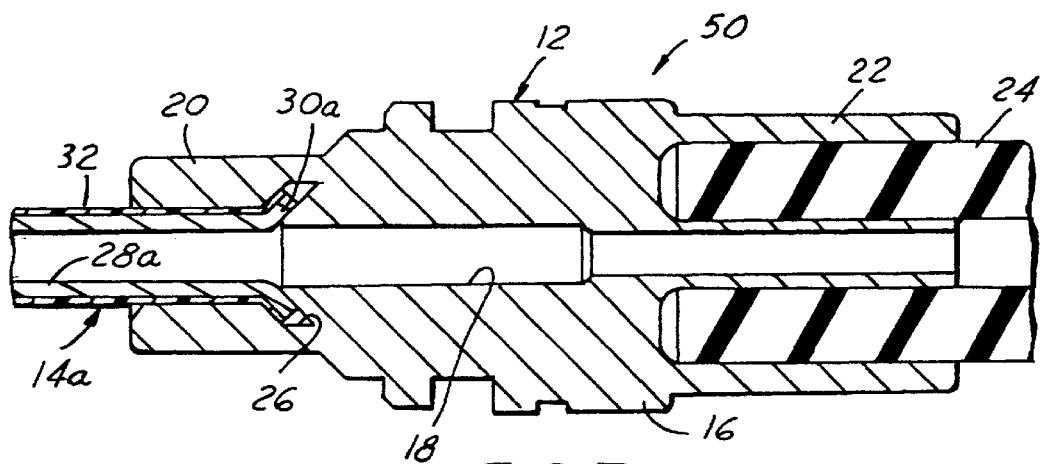
FIG. 7 is a fragmentary sectional view similar to that of FIG. 2 but showing a modified embodiment of the invention.
Figure 8:
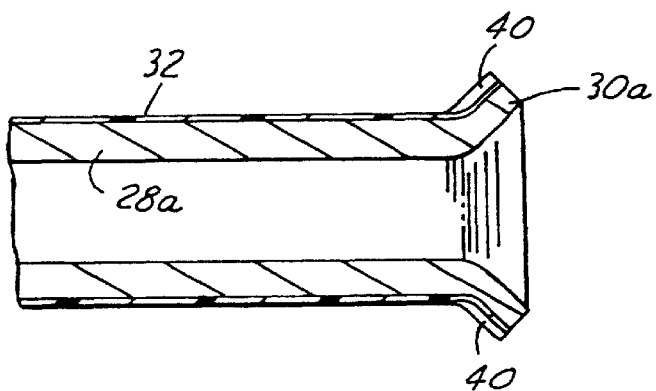
FIG. 8 is a fragmentary sectional view similar to that of FIG. 4 but illustrating the flared tube end in the embodiment of FIG. 7.

The embodiment of the invention illustrated in FIGS. 1–6 and discussed above is particularly useful in conjunction with tubes 14 having a relatively thin wall thickness in tube body 28. This double-wall flare design has been employed, for example, with tubes having a wall thickness of 0.025 to 0.028 inches, producing a double wall thickness of 0.050 to 0.056 inches. However, the present invention may also be employed in conjunction with tubes of larger diameter and having a greater wall thickness. When the tube wall thickness is on the order of 0.060 inches or larger, for example, there is no need to double the thickness of the tube at the flared end, and a single-thickness flare may be employed, as illustrated in FIGS. 7–8. Thus, FIGS. 7–8 illustrate a tube coupling arrangement 50, in which elements identical to those in FIGS. 1–6 are indicated by identical reference numerals, and elements similar to those in the embodiment of FIGS. 1–5 are indicated by correspondingly identical reference numerals followed by the suffix "a." The important difference between arrangement 50 in FIGS. 7–8 and arrangement 10 in FIGS. 1–6 lies in the fact that the flared end 30a of tube 14a is in FIGS. 7–8 not doubled upon itself, but has single wall thickness disposed in groove 30 of fitting 12. Barbs 40 are formed in the radially outer surface of flared end 30a, as in the previous embodiment.

There have thus been disclosed a tube coupling arrangement and method of manufacture that fully satisfy all of the objects and aims previously set forth. The invention provides robust tolerances on location, crimp diameter and angularity of the flared tube end. Flaring of the tube end and plastic deformation of the fitting body around the tube end can be achieved without damaging the corrosion coating on the tube body. Standard manufacturing processes and techniques are employed at relatively low manufacturing costs. The invention is able to withstand leakage at elevated hydraulic fluid pressures. Although the illustrated embodiments have been discussed in conjunction with hydraulic brake applications, the invention is by no means limited to such applications, but can be employed in any application in which it is desired to lock a tube end to a crimped metal component. Several modifications and variations have been disclosed. Other modifications and variations will readily suggest themselves to persons of ordinary skill in the art. The invention is intended to embrace all such modifications and variations as fall within the spirit and broad scope of the appended claims.

What is claimed is:

1. A tube coupling arrangement that comprises:

a metal fitting having an end, an internal through passage, and a circumferentially continuous conical groove extending radially and axially outwardly from said passage away from said end, and a metal tube received in said passage through said end and having an outwardly flared conical end disposed in said groove, the exterior of said end of said fitting being plastically shrink-deformed around said tube in fluid sealing engagement with an external surface of said tube and firmly to hold said tube end in fluid sealing engagement with said groove.

2. The coupling arrangement set forth in claim 1 wherein said conical end of said tube is doubled upon itself such that said conical end has a double tube wall thickness within said groove.

3. The coupling arrangement set forth in claim 1 wherein said conical end of said tube has a single wall thickness within said groove.

4. The coupling arrangement set forth in claim 1 wherein said conical end of said tube has a plurality of barbs formed in a radially outer surface of said flared end to engage said fitting within said groove and prevent rotation of said tube end with respect to said fitting.

5. The coupling arrangement set forth in claim 1 wherein said tube has a corrosion resistant external coating.

6. A tube coupling arrangement that comprises a cylindrical metal tube coupled to a metal fitting, an end of said tube being flared to form a conical end configuration, said conical end configuration being inserted into the fitting to abut a shoulder within the fitting, and wherein said fitting is secured to the tube by being plastically shrink-deformed in the entire material of the fitting around the tube end at least in an area of the fitting generally radially aligned with the tube end such that the flared tube end and an external surface of a cylindrical portion of the tube adjacent the flared end are fluid sealingly engaged by such shrink-deformed material of the fitting.

7. The coupling set forth in claim 6 wherein said tube end is folded upon itself such that said conical end configuration has a double wall thickness.

8. The coupling set forth in claim 6 wherein said fitting shoulder is conical, wherein said fitting has a cylindrical opening that terminates at said shoulder, wherein said conical end configuration is inserted into said opening to abut said shoulder, and wherein said shrink-deformed material is produced by plastically deforming said fitting axially and radially around said tube.

9. The coupling set forth in claim 8 wherein said flared end of said tube has at least one barb in a radially outer surface of said flared end engaging said fitting so as to prevent rotation of said tube within said fitting.

10. The coupling set forth in claim 8 wherein said flared end of said tube has two pairs of diametrically opposed and orthogonally spaced barbs in the radially outer surface of the flared end of said tube so as to prevent rotation of said tube within said fitting.

11. A fluid-tight tube coupling arrangement that comprises:

a fluid-conducting metal fitting and a fluid-conducting metal tube, said fitting having a tube-receiving end, an internal fluid-conducting through-passage having a tube-receiving passage portion opening at said end and extending axially inwardly of said fitting to a junction with a smaller diameter passage portion, and a circumferentially continuous conical shoulder extending radially and axially outwardly from the junction of said passage portions and away from said end, one open end of said fluid-conducting cylindrical metal tube being inserted in said tube-receiving passage portion of said fitting tube-receiving end to abut an outwardly flared, conical end of said tube against said fitting shoulder, said fitting and tube being coupled by externally applying shrink force on said tube-receiving end of said fitting so as to plastically deform said fitting end and thereby ensmall said tube-receiving passage portion around said tube in fluid sealing engagement with the flared end of the tube and a portion of the cylindrical external surface of said tube adjacent the flared tube end and to thereby firmly hold said flared tube end in fluid sealing engagement in a groove formed adjacent said shoulder during and by such plastic deformation.

12. The coupling of claim 11 wherein said conical end of said tube is doubled upon itself such that said conical end has a double tube wall thickness sealably captured within said groove.

13. The coupling of claim 11 wherein said conical end of said tube has a single wall thickness sealably captured within said groove.

14. The coupling of claim 11 wherein said conical end of said tube has a plurality of barbs formed in a radially outer surface of said flared end to engage said fitting within said groove and prevent rotation of said tube end with respect to said fitting.

15. The coupling of claim 11 wherein said tube has a corrosion resistant external coating.

16. A coupling comprising a fluid-conducting cylindrical metal tube sealably secured to a fluid-conducting metal fitting and wherein an end of the tube is flared to form a conical end configuration, said conical end configuration is inserted into said fitting to abut a shoulder within the fitting, and the fitting is secured to the tube end by plastically deforming the fitting to thereby shrink-engage fitting material in fluid sealing relation around the tube end by radially inwardly directed shrink forces applied to the exterior of the fitting in an area generally radially aligned with the flared end of the tube.

17. The coupling set forth in claim 16 wherein said shoulder is conical, wherein said fitting has a cylindrical opening that terminates at said shoulder, said conical end configuration being inserted into said opening to abut said conical shoulder, said fitting being plastically deformed to form a clamping and fluid sealing groove axially and radially around said flared end of the tube.

* * * * *

UNITED STATES PATENT AND TRADEMARK OFFICE
CERTIFICATE OF CORRECTION

PATENT NO. : 6,598,286 B1
DATED : October 21, 2003
INVENTOR(S) : Donald Howard Brugman, Jr.

It is certified that error appears in the above-identified patent and that said Letters Patent is hereby corrected as shown below:

<u>Title page,</u>
Insert item -- [73] Assignee: Dana Corporation, Toledo, (OH) --

Signed and Sealed this

Twenty-third Day of March, 2004

JON W. DUDAS
*Acting Director of the United States Patent and Trademark Office*